No. 697,096. Patented Apr. 8, 1902.
T. E. MAHONEY.
GOVERNOR MECHANISM FOR THRESHING MACHINES.
(Application filed May 21, 1901.)
(No Model.) 2 Sheets—Sheet 2.

UNITED STATES PATENT OFFICE.

THOMAS E. MAHONEY, OF BUNKERHILL, KANSAS.

GOVERNOR MECHANISM FOR THRESHING-MACHINES.

SPECIFICATION forming part of Letters Patent No. 697,096, dated April 8, 1902.

Application filed May 21, 1901. Serial No. 61,265. (No model.)

*To all whom it may concern:*

Be it known that I, THOMAS E. MAHONEY, a citizen of the United States, residing at Bunkerhill, in the county of Russell and State of Kansas, have invented a new and useful Governor Mechanism for Threshing-Machines, of which the following is a specification.

My invention is an improved regulator for threshing-machine feeders, and is an improvement on the regulating mechanism shown and described in Letters Patent of the United States No. 658,665, granted to me September 25, 1900.

The object of my present improvement is to provide means to prevent an undue accumulation of grain on the conveyer which feeds the threshing-machine and also to control the delivery of the grain by the said conveyer to prevent the choking of the threshing-machine.

My invention consists in the peculiar construction and combination of devices hereinafter fully set forth and claimed.

Figure 1:
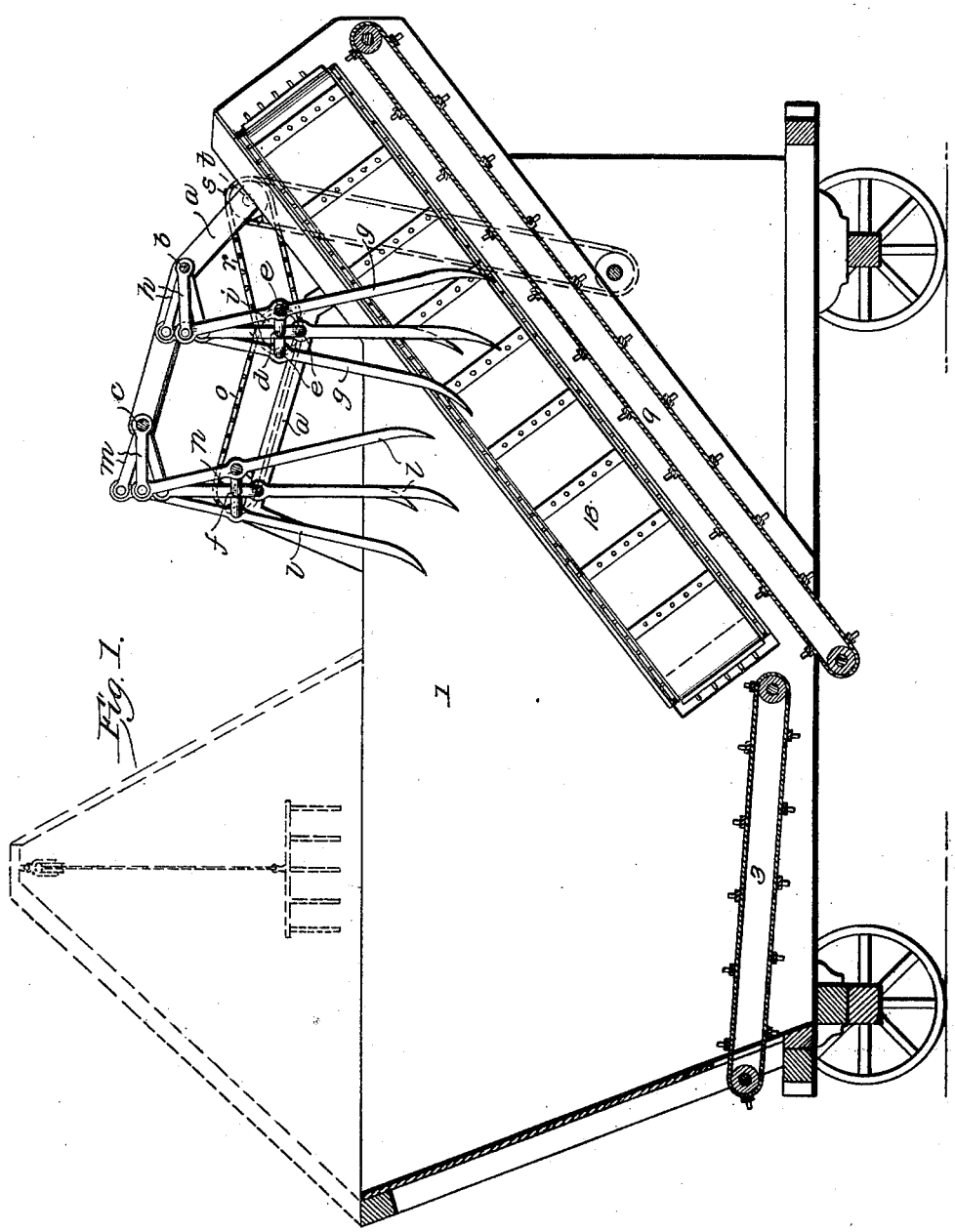
Figure 2:
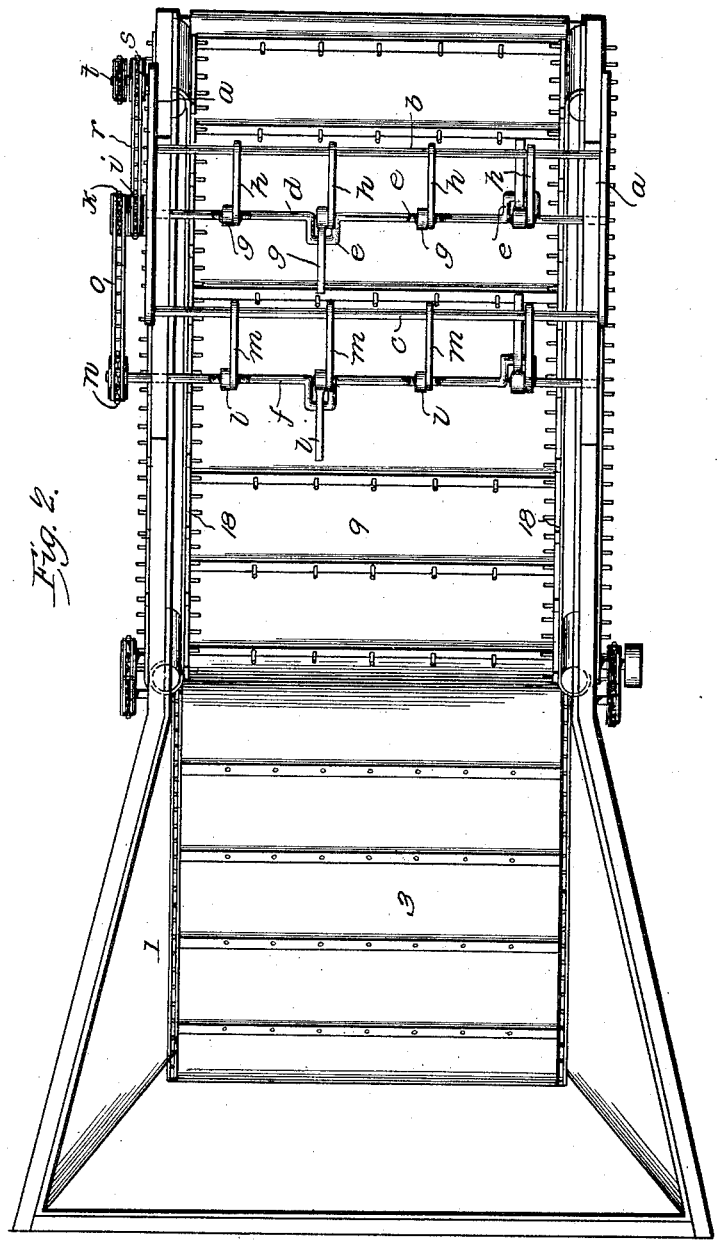

In the accompanying drawings, Figure 1 is a vertical longitudinal sectional view of a threshing-machine feeder provided with my improved regulating mechanism. Fig. 2 is a top plan view of the same.

The threshing-machine feeder comprises the hopper 1, the endless traveling conveyer 3 in the bottom thereof, the inclined feeder-conveyer 9, which conveys the grain from the hopper to the separating and threshing machine, and the auxiliary conveyers 18, which are disposed above and on opposite sides of the feeder-conveyer. This feeder is more fully described and is claimed in my pending application for Letters Patent of the United States, Serial No. 57,805, filed April 27, 1901. A suitable derrick-frame is disposed above the feeder and carried thereby, and a fork and operating-tackle therefor are provided for placing the grain in the hopper, as is fully described in the Letters Patent hereinbefore mentioned.

A pair of suitable side frames $a$ are carried by the hopper above the feeder-conveyer. A pair of cross-rods $b$ $c$ connect the said frames $a$, the said rod $b$ being a suitable distance in advance of the rod $c$. A shaft $d$, which is provided with a series of cranks $e$, disposed at an angle to each other, is journaled in bearings in the frames $a$ and is disposed below and at a slight distance in rear of the rod $b$. A similar crank-shaft $f$ is likewise journaled in bearings on said frames and is disposed below and in rear of the cross-rod $c$. To each of the cranks of shaft $d$ is pivotally connected a rake-finger $g$, and the upper end of each rake-finger is connected to the rod $b$ by a link $h$. The lower ends of the rake-fingers $g$ are disposed proximate to and at a suitable distance above the feeder-conveyer 9. At one end of the shaft $d$ are sprocket-wheels $i$ $k$.

A series of rake-fingers $l$ are respectively pivotally connected to the cranks of the shaft $f$, and the upper ends of said rake-fingers are connected to the rod $c$ by links $m$. Said shaft $f$ has at one end a sprocket-wheel $n$, which is connected to the sprocket-wheel $k$ of crank-shaft $d$ by an endless sprocket-chain $o$. Thereby power is conveyed from the shaft $d$ to the shaft $f$, and the said shafts are rotated in unison. The rake-fingers $l$ are disposed in a more elevated position than the rake-fingers $g$ and are farther from the discharge portion of the feeder-conveyer. It will be understood that when the shafts $d$ $f$ are rotated the rake-fingers $g$ $l$ rake rearwardly over the feeder-conveyer, the said fingers $g$ operating somewhat closely to the said feeder-conveyer and above the same, while the rake-fingers $l$ operate at a considerable distance above the fingers $g$ and in rear of said fingers $l$. Hence the fingers $l$ prevent an undue quantity of the grain from being carried to the fingers $g$, and the latter, which are effective immediately over the feeder-conveyer 9, serve to rake backwardly on the grain carried by said feeder-conveyer and to prevent an undue quantity of the grain from being discharged from the feeder-conveyer to the threshing mechanism.

Power may be conveyed to the crank-shaft $d$ by any suitable means. As here shown, an endless sprocket-chain $r$ connects the sprocket-wheel $i$ to a sprocket-wheel $s$ on a counter-shaft $t$, which is driven by any suitable means.

I do not desire to limit myself to the precise construction and combination of devices hereinbefore described, as it is evident that modifications may be made therein without departing from the spirit of my invention.

Having thus described my invention, I claim—

1. In a threshing-machine feeder of the class described, the combination of a hopper, an inclined endless traveling feeder-conveyer disposed therein and extending outwardly therefrom, and a plurality of rake-back mechanisms, operative above said feeder-conveyer, disposed one in advance of the other and supported at different elevations, the one nearer the discharge of the feeder-conveyer being lower and closer to said feeder-conveyer than the other, for the purpose set forth, substantially as described.

2. In combination with a threshing-machine feeder having a hopper and an inclined endless traveling feeder-conveyer, a revoluble shaft $d$ having a series of cranks, rake-fingers $g$ pivotally connected respectively to the said cranks, links, connecting the said rake-fingers to a fixed point, a crank-shaft $f$ having a series of cranks and disposed in rear of and at a higher plane than the crank $d$, rake-fingers $l$ pivotally connected respectively to the cranks of said shaft $f$, links connecting said rake-fingers $l$ to a fixed point and means to communicate power to said shafts $d, f$, substantially as described.

In testimony that I claim the foregoing as my own I have hereto affixed my signature in the presence of two witnesses.

THOMAS E. MAHONEY.

Witnesses:
W. H. BIAYS,
E. H. SMITH.